United States Patent [19]

Lingle

[11] 4,062,087
[45] Dec. 13, 1977

[54] SELF-SUSTAINING SPRING FASTENER CLIPS FOR FURNITURE RAILS AND ASSEMBLIES THEREOF

[75] Inventor: Harrison Church Lingle, Northbrook, Ill.

[73] Assignee: Hartco Company, Lincolnwood, Ill.

[21] Appl. No.: 679,904

[22] Filed: Apr. 26, 1976

[51] Int. Cl.² .................... A47C 23/02; A44B 21/00; F16F 3/02
[52] U.S. Cl. .................................. 24/84 R; 5/259 R; 24/86 B; 267/102; 403/208
[58] Field of Search ................ 5/259 R; 24/84–86 R, 24/86 B, 265 B; 29/243.56; 312/71, 72; 140/53, 93.4; 403/208; 267/102, 111

[56] References Cited

U.S. PATENT DOCUMENTS

| 2,583,056 | 1/1952 | Lang | 29/243.56 |
| 2,613,734 | 10/1952 | Hopkes | 5/259 B |
| 3,288,503 | 11/1966 | Slominski | 5/259 B |
| 3,422,468 | 1/1969 | Schutz | 5/259 R |
| 3,650,301 | 3/1972 | Karass | 140/93.4 |
| 3,672,738 | 6/1972 | Buttriss | 312/71 |
| 3,969,793 | 7/1976 | Crosby | 5/259 R |

Primary Examiner—Casmir A. Nunberg

[57] ABSTRACT

A metallic clip designed for holding the end bar of a sinuous cushion-supporting spring in position on one rail of an article of furniture and also having associated therewith jaw portions which straddle the rail and, when pressed inwardly against the rail, seize the sides of such rail and maintain the clip firmly in position on the rail. In one form of the invention, a string of such clips are held together in slightly spaced side-by-side fashion by a liner strip which is seated within the reentrant or reverse bends of the clips so that individual clips may be successively severed from the strip for application to the rail. In a modified form of the clip, means are provided whereby the clips may be stacked together loosely against complete separation so that individual clips may be successively removed from the stack at will for rail application. In either form, the string or stack is adapted for magazine feeding in association with a suitable automatic clip-applying tool by means of which the clips are successively applied to the rail.

5 Claims, 8 Drawing Figures

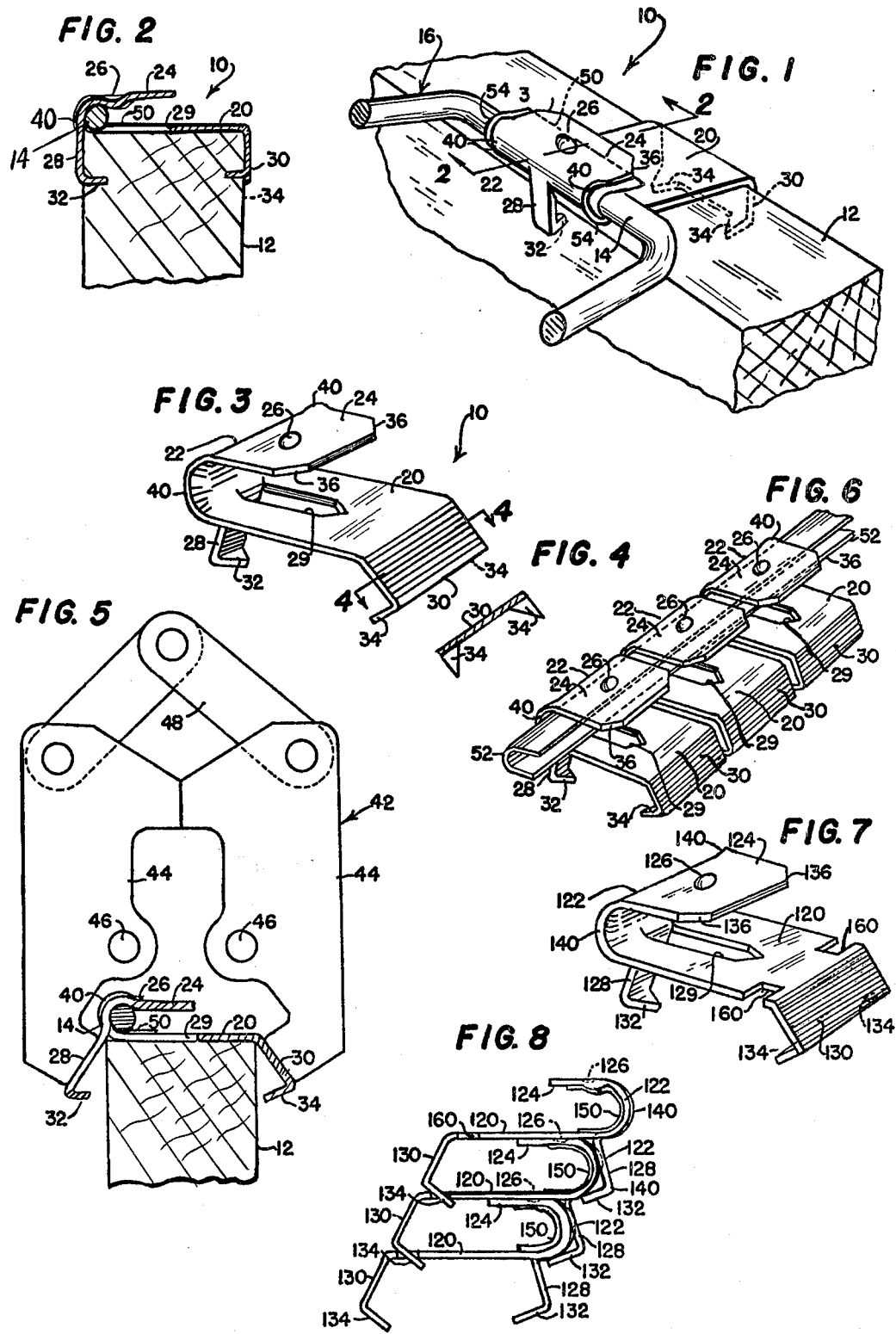

SELF-SUSTAINING SPRING FASTENER CLIPS FOR FURNITURE RAILS AND ASSEMBLIES THEREOF

The present invention relates to fastener clips of the type which are applied to the rails of furniture frames for anchoring the end bars of sinuous cushion-supporting springs in position on such rails.

Conventional clips of the general character under consideration are widely used in the furniture industry and, invariably, they are formed from sheet metal strip stock by a punch press operation so that each clip embodies a flat base portion which is nailed or stapled to the rail. Together with a hook-like reentrant or reverse bend which receives one end bar of the sinuous cushion supporting spring which extends across the frame. Although most of these clips rely entirely upon the nailing or stapling process for maintaining the clip on the rail, certain of them are provided with tangs or the like which are driven into the rail for clip-locating purposes. However, in such instances it is invariably necessary to rely upon nails or staples for the final anchoring of the clip to the rail. Where nailing or stapling operations are necessary, the clips are not readily amenable to automatic magazine feeding operations and, instead, considerable manual handling operations including careful nail or staple placements are necessary, such operations involving the use of skilled labor, to say nothing of the time consumed. Furthermore, experience has shown that such clips, whether held by nails or staples, leave much to be desired insofar as their holding power is concerned.

The present invention is designed to overcome the above-noted limitations that are attendant upon the use of conventional furniture clips and, toward this end, the invention contemplates the provision of a novel clip which is completely self-supporting on the furniture rail and requires no nails, staples or other extraneous attachment means for maintaining it in its fixed position and which, moreover, when applied, will satisfactorily withstand such tensional or other forces that may be applied thereto after its installation. The provision of such a clip constitutes one of the principle features of the present invention.

In carrying out this feature of the invention, it is contemplated that the base portion of the clip shall rest squarely upon the upper face of the rail, while a pair of outwardly and downwardly sloping jaws which are formed at the opposite ends of the base portion straddle the inside and outside faces of the rail so that when such jaws are bent or forced inwardly toward each other they will grip such faces or sides of the rail. Anchor tips or tines on the lower ends of the jaws penetrate the wood or other material of the rail and thus become embedded therein when the jaws are forced inwardly against the rail thereby encasing the opposite sides of the rail in a steel shroud, so to speak, and thereby strengthening the rail at such portions. In this manner splitting of the wood is eliminated as is the case when nails or staples are employed.

Another and important feature of the invention resides in the manner in which a series of such clips may be secured together in string-like fashion by means of a continuous elongated liner strip which is seated deep within the reentrant bends of all of the clips with adjacent clips being slightly spaced from each other. The thus produced string of clips is flexible and readily amenable to magazine feed operations using a suitable automatic tool for clip application to the rail. The slight spacing of the clips on the carrier or liner strip is such that as the individual clips are severed from the string, the portion of the strip which remains with the severed clip constitutes a cushioning liner within the bight portion or bend so that direct contact of the clip and the end bar of the spring is avoided. Moreover, because of the fact that severing operation is effected between adjacent clips, a slight liner overhang at the opposite side edges of the clip is produced and such an overhang accommodates the sloping of the side edges of the reentrant bend away from the end bar of the spring in order to avoid cutting of such side edges through the liner.

In a slightly modified form of the invention, the base portion of the clip is so designed that a series of the clips may be loosely stacked upon one another to produce a somewhat flexible stack of clips which also is readily adaptable to magazine feed from an automatic clip-applying tool. When thus stacked, the aforementioned gripping jaws of each clip embrace the base portion of a next adjacent clip, as well as its associated reentrant bend. Although adjacent clips are loosely disposed with respect to each other so that the stack remains intact during handling for placement in a tool magazine, such clips are locked to each other so that the stack remains intact. Separation of an individual clip from the stack may be accomplished by a prying operation which opens the jaws of such clip to a slight degree to release its adjacent clip.

From the above brief description it will be readily apparent that either of the two forms of clip disclosed herein is more economical in use than are conventional clips because nailing or stapling operations are not involved in its application to a rail. Moreover, nailing or stapling operations practically preclude magazine feed and automatic tool-applying operations where conventional clips are concerned whereas, with either form of the present clip, i.e. the ribbon-connected string of clips or the flexible stack of clips, tool magazine feed is made possible, as also are all the other necessary tool functions for successively affixing the clips to a rail.

Numerous other advantageous features of the invention, not at this time enumerated, will become readily apparent as the nature of the invention is better understood.

In the accompanying single sheet of drawings forming a part of this specification, two illustrative embodiments of the invention have been shown.

In these drawings:

FIG. 1 is a fragmentary perspective view of one rail of a furniture frame assembly showing a preferred form of the improved metal fastener clip, together with its associated antifriction liner, operatively applied thereto, and also showing the clip in supporting relationship with respect to one end bar of a simuous cushion-supporting spring;

FIG. 2 is a sectional view taken substantially on the vertical plane indicated by the lines 2—2 of FIG. 1 and in the direction of the arrows;

FIG. 3 is an enlarged perspective view of the metal clip in its free state;

FIG. 4 is a sectional view taken on the line 4—4 of FIG. 3;

FIG. 5 is a sectional view similar to FIG. 2, showing the clip juxtapositioned on the rail and in its free state preparatory to its being deformed to its clamped or secured position on the rail;

FIG. 6 is a fragmentary perspective view of a string of clips and illustrating the manner in which a length of liner material may be employed as a carrier for such clips;

FIG. 7 is a perspective view, similar to FIG. 3, showing a slightly modified form of clip; and FIG. 8 is a side elevational or edge view, showing the manner in which a series of the clips of FIG. 7 may be stacked together in superimposed relationship.

Referring now to the drawings in detail, and in particular to FIGS. 1 and 3 inclusive, a preferred form of spring fastening clip embodying the principles of the present invention is designated in its entirety by the reference numeral 10 and it is designed for attachment to one rail 12 of a cushion-supporting frame associated with the seat or back of an article of furniture such as a sofa, chair or the like. If it is assumed that the rail 12 is the front rail of such an article of furniture, it will be understood that the rail opposes a parallel back rail and that it is the function of the clip 10 to support the end bar 14 of one of a series of bowed sinuous spring strips or members 16 which extend between the rails. The clips 10 are arranged in opposing pairs on the front and back rails, each pair serving to support therebetween one of the spring members 16.

Referring now particularly to FIG. 3, the preferred form of clip 10 is successively formed from an elongated strip of sheet metal stock, preferably steel, by a punch press operation, and each clip involves in its general organization a flat base 20, one end of which is formed with a reentrant or reverse curved bend 22 thus establishing an upper portion 24 which overlies the base portion by a distance approximately equal to the diameter of the rod stock from which the sinuous spring member 16 is formed. Such reentrant bend 22 and overlying portion 24 establishes, in effect, a hook-like portion which is adapted to receive therein the aforementioned end bar 14 of one of the spring members 16. A small depression 26 is formed in the overlying portion 24 and serves to provide a downwardly extending boss which maintains the end bar 14 in position within the hook portion of the clip.

In order to maintain the base portion 20 seated squarely upon the upper face of the rail 12, a pair of opposed inside and outside gripping jaws 28 and 30 respectively are provided, each jaw extending downwardly and outwardly from the opposite ends of such base portion (see also FIG. 5) at an angle on the order of 130°. The jaw 28 is in the form of a relatively narrow centrally disposed tongue which is downstruck from the body portion 20, thus leaving a void 29 in the base portion 20 and the extreme lower end thereof is formed with an inturned rail-penetrating anchor tip or prong 32 of triangular configuration, such prong extending at an angle on the order of approximately 85° with respect to the body of the tongue. The jaw 30 is in the form of a full width, downwardly sloping portion having a pair of triangular anchor tips or prongs 34 which are turned inwardly from the lower corners of the jaw, likewise at an angle on the order of 85°. In the flat blank from which the clip 10 is formed, the two anchor prongs 34 constitute extensions of one extreme edge of the blank and therefore they are capable of being turned laterally inwardly along truly transverse lines as shown in FIGS. 3, 4 and 5. These extensions 34 at one end of the strip of metal from which the clip is formed leave commensurate truncated corners 36 at the other end of the strip and, specifically, in the overlying portion 24. In the installed clip, such truncated corners serve no useful function. However, during installation of the spring 18 after the clip has been anchored to the rail 12, they perform a minor function that will be made clear presently.

The opposite side edge regions of the reentrant bend 22 are flared outwardly as indicated at 40, the flares being coextensive with the entire bend. Such flaring of these edge portions of the clip serves a purpose that will be described presently.

Application of the clip 10 to the rail 12 may be effected by the simple expedient of causing the clip to rest upon the rail with the two jaws 28 and 30 overhanging the side edges of the rail as shown in FIG. 5, and then causing the jaws to be simultaneously displaced to the vertical position in which they are shown in FIG. 2. To effect such jaw closure upon the rail, suitable clamping mechanism 42 such as has schematically been illustrated in FIG. 5 may be employed, the mechanism preferably being associated with an automatic clip-applying apparatus wherein the cl-ps are magazine fed. The tool clamping mechanism shown in FIG. 5 embodies a pair of clip-engaging pressure jaws 44 which are independently pivoted at 46 to the tool body and having associated therewith a toggle mechanism 48 or other jaw opening and closing device for actuating the jaws 44. The illustrated mechanism 42 is entirely schematic in its representation and various other mechanisms having clip-engaging pressure jaws may be employed if desired. Upon closure of the pressure jaws 44, the clip jaws 28 and 30 are forced inwardly so that the anchor tips 32 and 34 penetrate and become embedded in the rail 12 as shown in FIG. 2 so that the jaws 28 and 30 confine the rail 12 therebetween. The clip is thus securely held in a self-supporting position upon the rail, thereby eliminating the necessity for employing nails, screws or other fastening devices such as are ordinarily employed in connection with anchor clips of the character under consideration. It is to be noted at this point that this surrounding of the rail with the metal of the clip serves to reinforce the adjacent regions of the rail and that there is no danger of splitting the rail as is the case where nails or staples are needed for clip anchoring purposes.

As is customary with conventional clips, the bight portion or bend 40 associated with the clip may be provided with a suitable sound deadening liner 50 which appears in FIGS. 1, 2 and 5, but which has been omitted in FIG. 3 which illustrates only the metal clip as it emerges from the punch press operation. Although in the present invention no novelty is predicated upon the use of such a liner within the reverse bend or bight portion 40 of the clip 10, an important feature of the invention resides in the use of a continuous elongated liner strip 52 such as is shown in FIG. 6 as a carrier strip or ribbon for interconnecting a series of such clips for machine application to a furniture rail. As shown in this view, the liner strip 52 is nested or tucked deep within the reverse bends 40 of the various clips and the latter are held in position on the liner strip 52 by means of a suitable adhesive. The clips may be fed to the rail by severing the strip 52 in between adjacent clips 10, thus leaving a slight overhang 54 as clearly shown in FIG. 1. This overhang 54 is of sufficient extent that it may wrap itself onto the outwardly flared portions 40 either upon manual handling of the spring 16 during initial application thereof to the clip, or during the life of the spring after the installation is made. In either case, in the absence of the outwardly flared portion, there would be the danger of the sharp edges of the bight portion or bend 22 cutting through the liner and contacting the end bar 14 of the spring 16, thus resulting in objectionable noise or squeaks when the spring is in use.

In FIGS. 6 and 7, a slightly modified form of fastener clip 110 has been shown. The clip 110 is similar in many respects to the previously described clip 10 and therefore, in order to avoid needless repetition of description, similar reference numerals but of a higher order have been applied to the corresponding parts as between the disclosures of FIGS. 3 and 7 for example.

The only difference between the clip 10 and the clip 110 resides in the fact that the latter clip is formed with a pair of oppositely disposed notches 160 in the base portion 120 of the clip. These notches enable successive clips 110 to be stacked upon each other in the manner illustrated in FIG. 8. It is to be noted that in the stacked position of the clips 110, the two anchor tips 134 of each clip fit within the two notches 160 of the subjacent clip while the outstruck narrow tongue or jaw 118, together with its anchor tip or prong 132, embraces the reentrant bend portion 122 of such subjacent clip. The clips hang together with a loose fit although in the stacking process it is necessary to distort the clips slightly to cause them to assume their stacked positions. One manner of thus distorting the clips is to cause the two anchor prongs 134 to rest initially within the notches 160 of an adjacent clip and then downward pressure upon the upper clip will "snap" the two adjacent clips together, the outstruck tongue or jaw 128 yielding slightly as it passes over the rentrant bend 122. Separation of adjacent clips may be accomplished by prying or pulling the clips apart in a reverse manner. It will be understood that where automatic machine application of the clips to the rail 12 is carried out, the applying tool will possess facilities for effecting such separation of clips.

Lining of the strips 110 may be accomplished in any suitable manner. The liners 150 shown in FIG. 8 are preferably applied to the strip of clip stock which is fed to the punch press so that the lining material is acted upon by the punch press instrumentalities while the clip is being formed. In order to avoid the presence of liner material on the inner side of the outstruck tongue or jaw 128, which by its presence would cause bunching of this material at the time that the jaws 128 and 130 are pressed inwardly against the opposite sides of the rail 12, it is desirable to scrape or otherwise remove the liner material from the tonque. Alternatively the liner material on the elongated strip of clip blank stock which is fed to the punch press may be provided with voids or openings commensurate in size and positioning with the regions on the clip blank stock where the tongues 128 are formed. At the risk of repetition, it is stated that except for the provision of the notches 160 in the clip 110, the latter remains substantially the same as the clip 10, at least insofar as its overall shape is concerned. Likewise, its mode of application to the rail 12 remains the same.

The invention is not to be limited to the exact arrangement of parts shown in the accompanying drawings or described in this specification as various changes in the details of construction may be resorted to without departing from the spirit of the invention. Although the clip 10 has been shown and described herein as being applied with its base 20 lying flat on the horizontal top surface of the rail 12 merely for convenience of description so that the tongue or jaw 28 becomes a vertical inside jaw which lies within the rectangular confines of the furniture frame, if the furniture frame to which the clip 10 is applied is a back frame the base 20 will, of course, extend vertically and the directional characteristics of the other components of the clip will assume commensurate attitudes. Therefore, only insofar as the invention has particularly been pointed out in the accompanying claims is the same to be limited.

Having thus described the invention, what I claim and desire to secure by letters patent is:

1. A self-supporting integral one-piece clip for securing the laterally turned end of a sinuous upholstery spring to the wooden rail an article of furniture, said clip being formed from an elongated strip of sheet metal stock and comprising: a stamping including a flat generally rectangular horizontal base portion designed for positioning on the top surface of said rail, an upper generally horizontal portion overlying the inside end region said base portion and spaced upwardly therefrom, and an interconnecting curvilinear reentrant bend extending between the inside ends of said base portion and overlying portion, said reentrant bend being adapted to receive the laterally turned end of the upholstery spring therein, said base portion, overlying portion, said reentrant bend all being of full clip width, said base portion being formed with a relatively narrow elongated downstruck tongue substantially midway between the side edges thereof and having its upper end extending centrally from the lower edge region of said reentrant bend, the outside end of said base portion being formed with a downturned flange-like portion which likewise is of full clip width, said downstruck tongue and downturned portion extending downwardly away from each other and providing inside and outside jaw portions which are adapted to straddle the inner and outer rail sides when the base portion is in position on the top surface of the rail, the lower end of said narrow downstruck tongue being provided with a laterally turned anchor prong and the lower edge of said downturned portion being provided with at least one laterally turned pointed anchor prong, the inside and outside jaw portions being designed for inward swinging movement toward each other upon application of inward pressure thereto to cause the opposed sides of the jaw portions to seize the sides of the rail coextensively in face-to-face contact therewith and the anchor prongs to fully penetrate the wood of the rail.

2. A self-supporting clip as set forth in claim 1, wherein the opposite edge regions of said curvilinear reentrant bend are flared outwardly in funnel-like fashion, and the inner side surface of said reentrant bend is adhesively lined with a length of cushioning material which overhangs the outwardly flared ends of such bend.

3. A self-supporting clip as set forth in claim 1, wherein a pair of anchor prongs are provided on the lower end of said downturned portion, each of said pointed anchor prongs constituting a right-triangular extension along one end edge of the blank from which the clip is formed, said pointed anchor prongs being turned laterally along a coincident transverse axis at an angle of slightly less than 90° so that when said jaw portions are swung inwardly toward each other such pointed anchor prongs will penetrate the wood of the rail sides in normal endwise fashion, the distal ends of said overlying horizontal portion being formed with truncated corners resulting from the severing of a previous stamping from the elongated strip of sheet metal by reason of the pointed anchor prongs on such previously severed stamping.

4. An upholstery anchor clip assembly for use in the magazine of a clip-applying tool, said assembly comprising a plurality of identical, generally U-shaped sheet metal clips having flat base portions adapted to seat on a planar surface of a furniture rail, upper overlying portions of less longitudinal extent than that of the base portions, interconnecting curved reentrant bends at corresponding ends of the base portions for receiving the end bars of respective upholstery springs, and depending jaw portions at the opposite ends of said base portions, said clips being disposed in a longitudinal row in side-by-side spaced relationship, and a narrow elongated carrier strip which is coextensive with said row, said carrier strip being in the form of a length of flexible cushioning liner material which is curved in transverse cross section and adhesively bonded to the inner sides of the reentrant bends substantially coextensively therewith so as to bridge the distance between adjacent clips, whereby when successive clips are removed from the assembly for application to a furniture rail by severing the curved carrier strip midway between adjacent clips, the severed portions of the carrier strips which remain with the removed clips overhang the end edges of the reentrant bends to prevent such edges from direct contact with the rail.

5. An upholstery spring anchoring clip assembly as set forth in claim 4, wherein the opposite end edge regions of the reentrant bends of the sheet metal clips are flared outwardly in funnel-like fashion and away from the carrier strip.

* * * * *